April 13, 1965   R. CURRY ETAL   3,178,113
HEAT STORAGE SYSTEM
Filed May 15, 1962
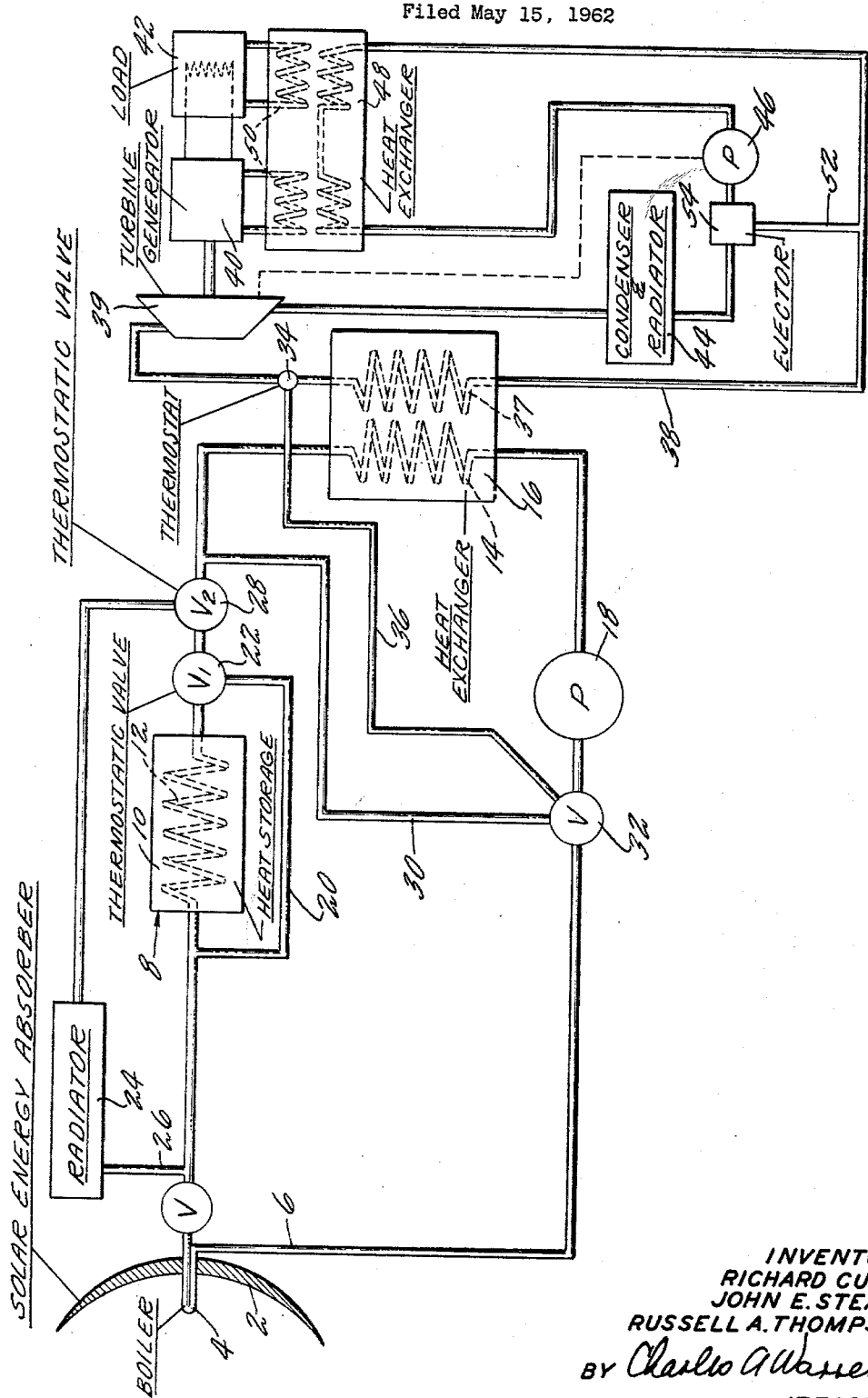
INVENTORS
RICHARD CURRY
JOHN E. STEARN
RUSSELL A. THOMPSON
BY Charles A. Warren
ATTORNEY

United States Patent Office 3,178,113
Patented Apr. 13, 1965

3,178,113
HEAT STORAGE SYSTEM
Richard Curry, Glastonbury, and Russell A. Thompson, East Hartford, Conn., and John E. Stearn, Zurich, Switzerland, assignors to United Aircraft Corporation, East Hartford, Conn., a corporation of Delaware
Filed May 15, 1962, Ser. No. 196,550
7 Claims. (Cl. 237—8)

This invention relates to a heat absorption and storage system particularly adapted to space installations.

One feature of the invention is a storage unit with an arrangement to control the rate of supply of heat energy to the storage unit so that the unit will operate at an efficient heat absorption rate.

Another feature of the invention is a bypass by which to control the rate of heat energy removal from the storage device such that only the required heat energy is withdrawn from the storage device.

Other features and advantages will be apparent from the specification and claims, and from the accompanying drawing which illustrates an embodiment of the invention.

The single figure is a diagrammatic showing of the power system.

The device is made up of two interconnecting systems, one of which constitutes the energy absorber and heat storage and release unit and the other constituting the conversion system by which the heat is converted to electricity and is available continuously whether the solar energy absorber is in operation. Accordingly, the device will produce electricity during the periods when the sun is not visible. The conversion system is not of itself a part of this invention; it is described and claimed in a copending application Serial No. 196,548, filed May 15, 1962, and assigned to the same assignee as this application.

The collection and storage system includes a heat energy collector or absorber which may be in the form of a parabolic mirror 2 directed toward a source of heat rays such as the sun and reflecting these rays onto a boiler 4. The boiler, as will be understood, is located close to the focal point of the mirror and liquid in the boiler is heated from the heat rays converging thereon. The boiler is in a circuit represented by the conduit 6 and this conduit includes a heat storage unit 8 which may, for example, be a unit as the type shown in the copending Shinn application Serial No. 34,588, filed June 7, 1960, having the same assignee as the present application. Basically, the heat storage unit includes a chamber 10 having a suitable heat absorbing fluid therein and the conduit 6 where it passes through the chamber 10 is in the form of a heating coil 12.

The circuit 6 gives up heat in the coil 14 of a heat exchanger 16 and the system is so designed that heat is available in the heat exchanger 16 continuously even though the boiler 4 is not being heated.

Downstream of the heat exchanger 14 in the circuit is a pump 18 which circulates the liquid in the circuit 6 so that it passes from the boiler 4 through the heat storage coil 12 and the heat exchanger 16 and thence through the pump and back to the boiler.

The heat storage unit or device 8 is designed to absorb heat energy or to release heat energy at a predetermined rate at which the storage unit will operate efficiently. To control the rate of heat supply to the heat storage device and to maintain a constant entering temperature at the coil 14 a bypass conduit 20 provides a fluid connection around the heat storage unit. The flow through the bypass 20 is controlled by a thermostatic valve 22 located at the junction of the bypass with the conduit 6 downstream of the heat storage device and responsive to the temperature of the fluid in the circuit 6 at this point. If the fluid temperature varies at this point, the valve 22 will be opened or closed and will vary the flow through the bypass. For example, if the temperature decreases at this point, the bypass will be opened to permit a greater bypass of the hot fluid from the boiler.

Where the device operates in space and may be at a higher than design altitude, the boiler will receive more heat than the device is designed to utilize. In order that the system may operate more efficiently, the excess of heat at this time may be disposed of in a radiator 24 located in a bypass conduit 26 around the heat storage unit. To control the rate of heat disposal in the radiator 24, a thermostatic valve 28 is provided where the conduit 26 joins the circuit 6 downstream of the valve 22. This valve 28 is responsive to temperature in the circuit 6 at this point and will open the valve 28 when the actual temperature of the fluid exceeds the design temperature in the circuit at this point. Thus, the excess heat will be disposed of through the radiator and the temperature reaching the coil 14 remains substantially constant. This radiator 24 is also usable if the heat storage device 10 has stored all of the heat energy for which it is designed. In this event, the valve 22 would be completely closed and the valve 28 would become effective to circulate the heated fluid through the radiator 24 thereby maintaining the temperature of the fluid reaching the coil 14 at the desired temperature. It will be understood that the thermostatic setting for the valve 28 must of necessity be a few degrees higher than the setting of the valve 22 in order to assure the proper sequencing of valve operation.

The circuit 6 also incorporates a nocturnal bypass conduit 30 from a point downstream of the pump 18 to a point downstream of the thermostatic valve 28. This bypass permits fluid from the pump to be returned directly to a point downstream of the heat storage unit in the event that all the heat available in the fluid in the heat exchanger coil 14 is not utilized. The bypass conduit 30 incorporates a mixing valve 32 which is controlled in response to temperature in the power conversion system on the output side of the heat exchanger 16. A thermostat 34 is utilized to sense the output of the heat exchanger and to control the valve 32 through a conduit 36. Thus, if the temperature at this point is higher than design temperature, part of the fluid from the pump is bypassed through the conduit 30 thereby reducing the withdrawal of heat from the heat storage device and also reducing the necessity for pumping this portion of the fluid through the boiler and heat storage device. The valve 32 is accordingly moved in an opening direction in response to an increase in temperature at the thermostat thereby increasing the portion of fluid flowing through the bypass.

The power conversion system which, as above stated, is not of itself a part of this invention (it is described to show a particular arrangement for utilizing the present invention) includes a second coil 37 in the heat exchanger 16, this coil being in a fluid circuit 38. Heat from the coil 14 in the heat exchanger 16 vaporizes the liquid in the coil 37 and this vapor powers a turbine 39 also located in the circuit 36. The turbine drives a generator 40 which supplies electrical energy for a load represented by the coil 42.

From the turbine the vapor therein is delivered to a condenser and radiator 44 also in the circuit 36 where the vapor loses heat and is condensed to a liquid. With the thermostat 34 located in circuit 38 on the delivery or output side of the heat exchanger the temperature of the fluid admitted to the turbine will remain substantially constant.

Downstream of the condenser 44 is a pump 46 connected to and driven directly from the turbine 39. This pump delivers the fluid in the circuit 38 through a secondary heat exchanger 48 where the liquid is additionally heated in accepting heat from the coils 50 which function to maintain the generator and the load at suitable temperature. From the heat exchanger 48 the greater part of the liquid continues through circuit 38 and back to the coil 37 in the heat exchanger 16. A bypass conduit 52 connects from the circuit 38 downstream of the heat exchanger 48 to an ejector 54 at the inlet of the pump 46. This ejector uses a portion of the flow downstream of the heat exchanger 48 as its primary stream and adjusts the condenser fluid from the condenser and radiator 44 to the desired pump inlet pressure. The effect of this ejector is to permit the pump to run at design speed without cavitation and also permits the use of a large secondary cooling flow, that is, the flow in the circuit 38, to reduce the cooling requirements of the condenser and radiator thereby making it possible for this device to be more compact. By maintaining a constant heat input into the heat exchanger 16, and thus a constant heat output, it is possible to have the turbine operate under design conditions with no functioning turbine controls.

It is to be understood that the invention is not limited to the specific embodiment herein illustrated and described, but may be used in other ways without departure from its spirit as defined by the following claims.

We claim:

1. A power conversion system including a heat energy collector for heating a fluid, a circuit for the fluid including the collector, a heat storage device downstream of the collector in the circuit, a heat exchanger downstream of the storage device in the circuit for utilizing a part of the heat from the fluid, a pump for returning fluid from the heat exchanger to the collector, a bypass around said storage device and a thermostatic valve in said bypass responsive to the temperature of the fluid in the circuit downstream of the heat storage device to control the flow through said bypass for maintaining a substantially constant inlet temperature to the heat exchanger.

2. A conversion system as in claim 1 in which a second bypass is provided, said second bypass being from the discharge side of the pump to the circuit upstream of the heat exchanger and a temperature controlled valve which varies the proportion of the flow through the second bypass to control the heat input to the heat exchanger.

3. A conversion system as in claim 1 in which a heat disposal device is provided in the circuit between the collector and the heat exchanger and in parallel relation to the heat storage device for disposing of heat energy in excess of the amount usable by the heat storage device and the heat exchanger.

4. A conversion system as in claim 3 in which a second thermostatic valve is provided, this valve controlling the flow of fluid through the heat disposal device and being responsive to fluid temperature in the circuit upstream of the heat exchanger.

5. A solar powerplant including a heat energy collector for heating fluid, a circuit for the fluid including the collector, a heat storage device in the circuit, a heat utilizing device in the circuit downstream of the heat storage device and having a variable temperature output, a pump in the circuit, means for bypassing the collector and heat storage device to return fluid from the pump directly to the inlet of the utilizing device, and a thermostatic valve for controlling said bypassing means, said valve being responsive to the changes in the temperature of the output of the heat utilizing device.

6. A solar powerplant as in claim 5 in which a heat disposal device is provided in a bypass around the storage device and in which a thermostatically controlled valve means controls the flow in the heat disposal device bypass, said thermostatically controlled valve means being responsive to the temperature of the fluid in said circuit downstream of the heat storage device.

7. A solar powerplant as in claim 5 in which a second bypass is provided, this bypass extending around the heat storage device with a thermostatic valve in the junction of the bypass with the circuit downstream of the heat storage device for controlling the flow in said bypass to maintain a selected fluid temperature at the inlet to the heat utilizing device.

References Cited by the Examiner
UNITED STATES PATENTS

| | | |
|---|---|---|
| 1,371,444 | 3/21 | Sherbondy. |
| 2,204,708 | 6/40 | Smith _____ 237—63 X |
| 2,529,154 | 11/50 | Hammond et al. _____ 237—1 |
| 2,544,474 | 3/51 | Swanton _____ 237—1 |
| 2,689,090 | 9/54 | Wetherbee et al. _____ 237—1 |
| 2,751,156 | 6/56 | Morgan. |
| 2,780,415 | 2/57 | Gay _____ 126—270 X |
| 2,889,116 | 6/59 | McCracken et al. |
| 3,070,703 | 12/62 | Podolny _____ 126—270 X |

EDWARD J. MICHAEL, *Primary Examiner.*
ARTHUR M. HORTON, PERCY L. PATRICK,
*Examiners.*